United States Patent [19]

Nakagomi

[11] Patent Number: 4,996,779
[45] Date of Patent: Mar. 5, 1991

[54] PLASTIC MATERIAL DRYER

[75] Inventor: Shoji Nakagomi, Kawaguchi, Japan

[73] Assignee: Nissui Kako Co., Ltd., Kawaguchi, Japan

[21] Appl. No.: 327,525

[22] Filed: Mar. 23, 1989

[30] Foreign Application Priority Data

Mar. 24, 1988 [JP] Japan .................................. 63-70121

[51] Int. Cl.⁵ ........................... B01K 5/00; H05B 6/78
[52] U.S. Cl. .................................... 34/1; 219/10.55 A
[58] Field of Search .............................. 34/1, 17, 68; 219/10.55 A

[56] References Cited

U.S. PATENT DOCUMENTS 4,510,361 4/1985 Mahan .................................. 34/1 X Primary Examiner—Henry A. Bennet
Attorney, Agent, or Firm—Krass & Young

[57] ABSTRACT

A method of and apparatus for effectively drying pelletized or powdered plastic material by irradiation of the plastic material by microwaves while agitating it in a rotating drum that provides for sealing against leakage of plastic material or microwaves and provides means for exhausting moisture laden air therefrom. The combination of radiation by microwaves, even agitation by the rotating drum, and exhaustion of moisture driven from the plastic material provides a method of effectively drying plastic material uniformly, efficiently, and to a state of sufficient dryness for proper molding.

9 Claims, 1 Drawing Sheet

PLASTIC MATERIAL DRYER

FIELD OF THE INVENTION

This invention relates to an apparatus and method for drying pelletized or powdered plastic material, and more particularly to drying said material in a rotating drum into which microwave energy is introduced.

BACKGROUND OF THE INVENTION

It is known and widely recognized that the processing of plastics containing moisture severely affects the quality of the processed material. The surface appearance is affected and the accuracy and strength of the molded product decreases due to the presence of moisture in the plastic pellets or powder being processed. The less moisture contained in the plastic starting material the better the final product is the case for most moldable plastic material. Specifically, engineering plastics such as nylon, polycarbonate, ABS, and polyethylenepterathylate (PET) are greatly affected by the presence of moisture during the molding process. For example, water vapor content should be below 50 ppm for molding of PET bottles, and below 100 ppm for molding polycarbonate compact discs.

Conventionally, a heated, dried air is circulated through the wet plastic material. The hot dry air is generated by heaters and disicant materials. The efficiency of heating air by means of heat exchangers is low, as is the efficiency of heating plastic materials with air. For example, the proper drying of PET with air requires 5-6 hours. The plastic materials dried by the conventional methods are heated from the outside. Since plastics are good heat insulators, drying times are long.

What is needed is a method which shortens drying time, enables more uniform drying of pelletized or powdered plastic material, and improves the efficiency of the drying process.

SUMMARY OF THE INVENTION

According to the invention, plastic material is irradiated by microwave radiation during agitation, with the vaporized moisture driven out of the plastic material being purged from the agitating container by dry air or gas. In operation, microwaves are generated from a magnetron at 2,450 mHz. The microwaves are absorbed by the moisture containing plastic material. The microwaves vibrate the water molecules and frictional heat raises the plastic material temperature to a point where the moisture is vaporized and driven therefrom. In contrast to other processes, microwave drying occurs due to internal generation of heat.

It has been found that, by agitation of the plastic material being dried, the drying time is improved, as well as the uniformity of drying. Purging the water vapor driven from the drying plastic material with a small amount of dry air is also helpful.

BRIEF DESCRIPTION OF THE DRAWING

The FIGURE is an elevational, part sectional, part schematic view of a drying apparatus according to the present invention.

DETAILED DESCRIPTION OF THE PREFERRED EMBODIMENTS

Figure 1:
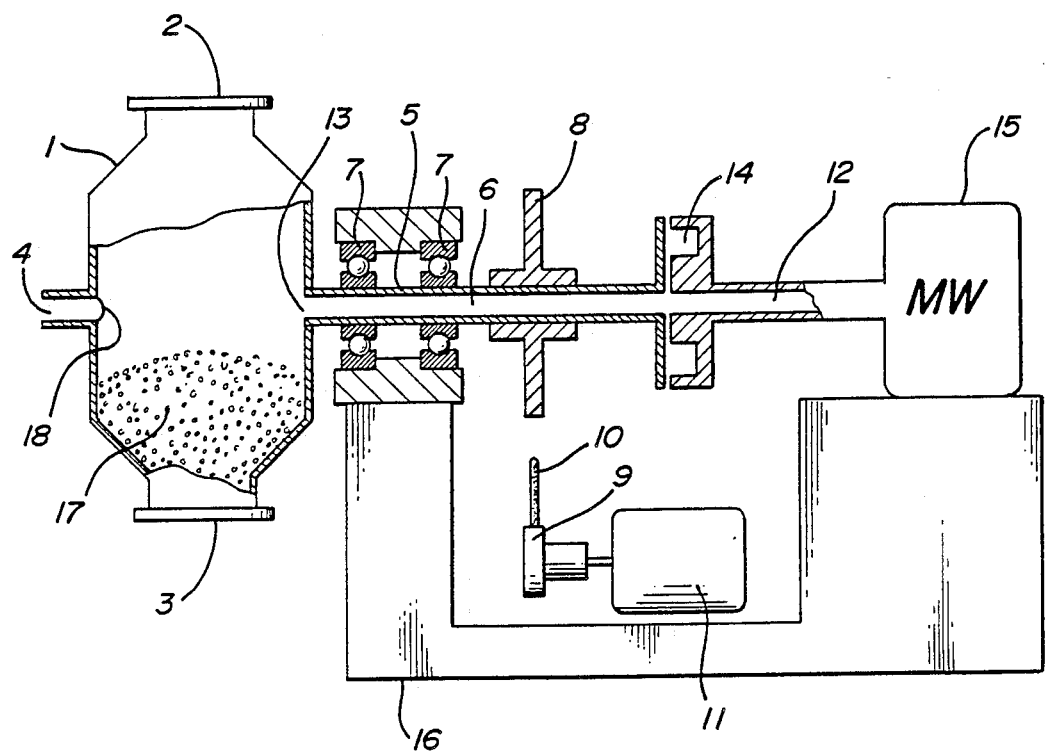

The FIGURE shows an example of a drying mechanism according to the present invention. Plastic material 17 is fed into a drying drum (1) thru the material entrance port (2) which is closed during the drying process. The material 17 is agitated by rotating the drum (1) about a horizontal axis created by the hollow shaft (5) which is driven by a motor (11) transmitting its force thru pulley (9), drive belt (10) and pulley (8). Frame (16) supports bearings (7) disposed around rotating hollow shaft (5). A magnetron (microwave generator) (15) is connected to a stationary duct (12) and microwave seal coupling (14) which is alligned with the hollow shaft (5). Hollow shaft (5) also serves as the microwave duct (6) that carries microwaves from the microwave generator (15) thru the stationary duct (12) and microwave seal coupling (14). The microwave duct (6) is connected to microwave port (13) at the axis of the rotating drying drum (1).

The contained plastic material (17) is agitated, and microwaves are radiated into the rotating drying drum (1) thru the microwave port (13). The microwaves irradiate the agitated plastic (17) and raise the temperature of the moisture contained therein until it is vaporized and driven into the rotating drying drum (1). This vaporized moisture is driven thru a punched metal material (18) that does not allow either plastic material or microwaves to pass thru moisture exit port (4). All ports and couplings are sealed against the leakage of microwaves.

I claim:

1. An apparatus for drying particulate plastic material for subsequent processing, said apparatus comprising:
   a drum for containing said material having a material entry port and a material egress port disposed thereon;
   a rotatable, horizontally disposed, hollow conduit defining an axis of rotation and having first and second ends, the first end being in fluid communication with said drum and supporting said drum such that rotation of said hollow conduit causes the drum to rotate about the axis of rotation;
   a means for rotatably supporting said hollow conduit;
   a source of microwave radiation having means for emission of microwaves therefrom disposed thereon;
   a stationary duct in communication with said microwave source and said second end of said hollow conduit, and aligned therewith, said hollow conduit and said stationary duct together defining a microwave duct to guide microwaves from the microwave source to the drum; and
   means for coupling said stationary duct and second end of said hollow conduit and preventing escape of microwaves at said coupling.

2. The apparatus of claim 1 further comprising means for rotating the hollow conduit and drum to cause agitation of the plastic material contained therein.

3. The apparatus of claim 2 wherein the rotation means comprises a drive motor operatively connected to the hollow conduit.

4. The apparatus of claim 1 wherein the support means comprises a frame.

5. The apparatus of claim 4 further comprising bearing means disposed between the hollow conduit and the frame.

6. The apparatus of claim 1 wherein the coupling means comprises a microwave seal coupling.

7. The apparatus of claim 1 further comprising means for permitting exhaustion of moisture-laden air from said drum during the drying process while preventing escape of plastic material therefrom.

8. The apparatus of claim 7 wherein the prevention means comprises a punched metal screen.

9. The apparatus of claim 1 wherein the microwave radiation has a frequency of approximately 2,450 mHz.

* * * * *